(12) United States Patent
Ross

(10) Patent No.: US 11,792,292 B2
(45) Date of Patent: *Oct. 17, 2023

(54) CONTENT STORAGE AND PROCESSING IN NETWORK BASE STATIONS AND METHODS FOR CONTENT DELIVERY IN A MESH NETWORK

(71) Applicant: Vivint, Inc., Provo, UT (US)

(72) Inventor: Kevin Ross, Saratoga Springs, UT (US)

(73) Assignee: VIVINT, INC., Provo, UT (US)

( * ) Notice: Subject to any disclaimer, the term of this patent is extended or adjusted under 35 U.S.C. 154(b) by 234 days.

This patent is subject to a terminal disclaimer.

(21) Appl. No.: 16/736,564

(22) Filed: Jan. 7, 2020

(65) Prior Publication Data

US 2020/0220943 A1 Jul. 9, 2020

Related U.S. Application Data

(63) Continuation of application No. 14/203,059, filed on Mar. 10, 2014, now Pat. No. 10,530,882.

(Continued)

(51) Int. Cl.
| | |
|---|---|
| *H04N 21/61* | (2011.01) |
| *H04L 67/568* | (2022.01) |
| *H04W 28/14* | (2009.01) |
| *H04L 67/1097* | (2022.01) |
| *H04L 67/52* | (2022.01) |
| *H04N 21/414* | (2011.01) |

(52) U.S. Cl.
CPC ........ *H04L 67/568* (2022.05); *H04L 67/1097* (2013.01); *H04L 67/52* (2022.05); *H04N 21/6131* (2013.01); *H04N 21/6137* (2013.01); *H04W 28/14* (2013.01); *H04N 21/41407* (2013.01)

(58) Field of Classification Search
None
See application file for complete search history.

(56) References Cited

U.S. PATENT DOCUMENTS

| | | | |
|---|---|---|---|
| 5,956,716 A * | 9/1999 | Kenner | ............. H04N 21/4622 |
| 6,941,338 B1 | 9/2005 | Madsen | |

(Continued)

OTHER PUBLICATIONS

Arvidsson et al., "Optimised local caching in cellular mobile networks," Computer Networks 55, Elsevier, pp. 4101-4111, Jul. 30, 2011.

*Primary Examiner* — Jason K Lin
(74) *Attorney, Agent, or Firm* — Kunzler Bean & Adamson

(57) ABSTRACT

A system includes a base station having a local storage device and a local processor, and providing a cell in a network for one or more clients communicatively connected to the base station. A content distribution module of the system is configured to store a local copy of a digital content item. A remote copy of the digital content item is stored on a remote computing device. A content request module of the system is configured to receive a request for the digital content item. A content serving module of the system is configured to identify at least one secondary source other than the remote computing device and the base station that stores a secondary copy of the digital content item, determine which of the local, remote and secondary copies of the digital content item may be delivered in a least amount of time, and deliver that copy.

20 Claims, 11 Drawing Sheets

Related U.S. Application Data

(60) Provisional application No. 61/794,521, filed on Mar. 15, 2013.

(56) References Cited

U.S. PATENT DOCUMENTS

| | | |
|---|---|---|
| 7,653,689 B1 | 1/2010 | Champagne et al. |
| 7,801,530 B2 | 9/2010 | Oswal et al. |
| 8,248,931 B2 | 8/2012 | Klein et al. |
| 8,626,876 B1 | 1/2014 | Kokal et al. |
| 9,516,625 B2 | 12/2016 | Zakrzewski |
| 2002/0065899 A1 | 5/2002 | Smith et al. |
| 2005/0102300 A1* | 5/2005 | Madsen ............... G06F 16/9574 |
| 2006/0203829 A1 | 9/2006 | Benco et al. |
| 2008/0025723 A1 | 1/2008 | Mayer et al. |
| 2008/0155059 A1* | 6/2008 | Hardin ................. H04N 21/816 |
| | | 709/218 |
| 2009/0043820 A1* | 2/2009 | Gazzard ............ H04M 3/42348 |
| 2010/0027522 A1 | 2/2010 | Mukai et al. |
| 2011/0125820 A1 | 5/2011 | Lin |
| 2011/0141887 A1* | 6/2011 | Klein .................... H04L 67/325 |
| | | 370/230 |
| 2012/0099457 A1 | 4/2012 | Roy |
| 2012/0110036 A1 | 5/2012 | Rabii et al. |
| 2012/0117157 A1 | 5/2012 | Ristock |
| 2012/0159558 A1 | 6/2012 | Whyte et al. |
| 2013/0018978 A1 | 1/2013 | Crowe et al. |
| 2013/0042071 A1* | 2/2013 | Chetlur ............... H04L 65/4084 |
| | | 711/130 |
| 2013/0061076 A1 | 3/2013 | VerSteeg |
| 2013/0251339 A1* | 9/2013 | Crowder ............ H04N 21/8456 |
| | | 386/241 |
| 2014/0280454 A1 | 9/2014 | Medard et al. |
| 2014/0280702 A1 | 9/2014 | Barker et al. |

\* cited by examiner

CONTENT STORAGE AND PROCESSING IN NETWORK BASE STATIONS AND METHODS FOR CONTENT DELIVERY IN A MESH NETWORK

RELATED APPLICATIONS

This application is a continuation of U.S. patent application Ser. No. 14/203,059, filed Mar. 10, 2014, and entitled CONTENT STORAGE AND PROCESSING IN NETWORK BASE STATIONS AND METHODS FOR CONTENT DELIVERY IN A MESH NETWORK, which claims the benefit of the filing date of U.S. Provisional Application No. 61/794,521, filed Mar. 15, 2013, and entitled CONTENT STORAGE AND PROCESSING IN NETWORK BASE STATIONS AND METHODS FOR CONTENT DELIVERY IN A MESH NETWORK, which is assigned to the assignee hereof.

TECHNICAL FIELD

This disclosure relates generally to methods and systems for storing content in a network and delivering that content to client devices, and more particularly for storing content at the edges of a network.

BACKGROUND

Strain and traffic on networks is increasing as consumers (such as Internet subscribers) access more and more data from networks and as content providers serve larger, richer data content to consumers. Streaming and downloading a high definition (HD) movie, for example, requires considerable bandwidth. When multiple consumers are streaming HD movies, the resulting traffic may strain the network. In addition, poor latency, packet loss, and other network issues may cause the HD movie to stall or otherwise decrease the quality of the experience for the consumer.

Network operators have an incentive to improve the ability of the network to distribute content to users in a manner that reduces the traffic on the network and that also improves the experience for the consumers.

SUMMARY

Disclosed herein are devices and approaches to utilizing a base station, such as a cellular network tower, for content distribution to one or more users. In one embodiment, a system includes a base station, a content distribution module, a content request module, and a content serving module. The base station includes a local storage device and a local processor, and provides a cell in a network for one or more clients communicatively connected to the base station. The content distribution module is configured to store a local copy of a digital content item in the local storage device of the base station. The content request module is configured to receive, from a client communicatively connected to the base station, a request for the digital content item, a remote copy of the digital content item being stored on a remote computing device. The content serving module is configured to identify at least one secondary source other than the remote computing device and the base station that stores a secondary copy of the digital content item, determine which of the local, remote and secondary copies of the digital content item may be delivered to the client in a least amount of time, and deliver the local, remote or secondary copy that requires the least amount of time.

In one example, the base station may be a backhaul point in a cellular network. The content distribution module may be configured to receive additional digital content items from at least one remote computing device and to store the additional digital content items in the local storage device of the base station. The content distribution module may be configured to request the digital content item from the remote computing device and store the digital content item on the local storage device as the local copy for future use. The content serving module may be configured to estimate times for delivering the local, remote and secondary copies to the client. The at least one secondary source may include at least one additional base station. The content serving module may be configured to confirm that the remote copy is available at the remote computing device and confirm that the local copy is available at the local storage device. The base station may be a component in a wireless network. The wireless network may be a cellular network. The digital content item may be one of an audio file, a music file, a video file, a database file, and a picture file.

Another embodiment is directed to a method for distributing digital content. The method includes storing a local copy of at least one digital content item in a local storage device of a base station, a remote copy of the at least one digital content item being stored on a remote computing device. The method also includes delivering the local copy from the local storage device instead of the remote copy in response to a client of the base station requesting the at least one digital content item from the remote computing device, and identifying digital content items that have a lowest request rate from clients of the base station and deleting local copies of the identified lowest request rate digital content items.

In one example, the method further includes identifying at least one secondary source other than the remote computing device and the base station that stores a secondary copy of the at least one digital content item, and identifying digital content items that have a lowest request rate from clients of the base station and the at least one secondary source and deleting local and secondary copies of the identified lowest request rate digital content items. The method may include identifying digital content items most likely to be requested by clients of the base station in the future and storing local copies for each identified most likely to be requested digital content item. The method may include identifying at least one secondary source other than the remote computing device and the base station that stores a secondary copy of the at least one digital content item, determining which of the local, remote and secondary copies of the at least one digital content item may be delivered to the client in a least amount of time, and delivering the local, remote or secondary copy that requires the least amount of time.

A further embodiment may relate to a system for distributing digital content. The system includes a first node communicatively connected to an Internet backhaul point, and a plurality of second nodes forming a mesh network with the first node, whereby each of the plurality of second nodes is communicatively connected to the Internet backhaul point through the mesh network. The first node includes a local storage device, a local processor, and a content request module, and a content serving module. The content request module is configured to receive from a client communicatively connected to the first node a request for a digital content item from a remote computing device, determine if the local storage device has a local copy of the digital content item, and determine if any of the plurality of second nodes has a secondary copy of the digital content item. The content serving module is configured to determine which of the local, secondary and remote copies of the digital content item may be delivered to the client in a least amount of time, and deliver to the client the local, secondary or remote copy that requires the least amount of time to deliver to the client.

In one example, the first node may include a local network module configured to deliver the local copy of the local copy is available on the local storage device. The first node may include a cache module configured to implement a cache of a plurality of digital content items on the local storage device for one or more clients of the first node. The first node may include a network cache module configured to implement a cache of a plurality of remote digital content items stored on the plurality of second nodes in the mesh network. The first node may include a content distribution module configured to receive and store at least one local copy of the digital content item in the local storage device, wherein the at least one local copy is pushed to the content distribution module by an authorized remote computing device. The mesh network may be a wireless mesh network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
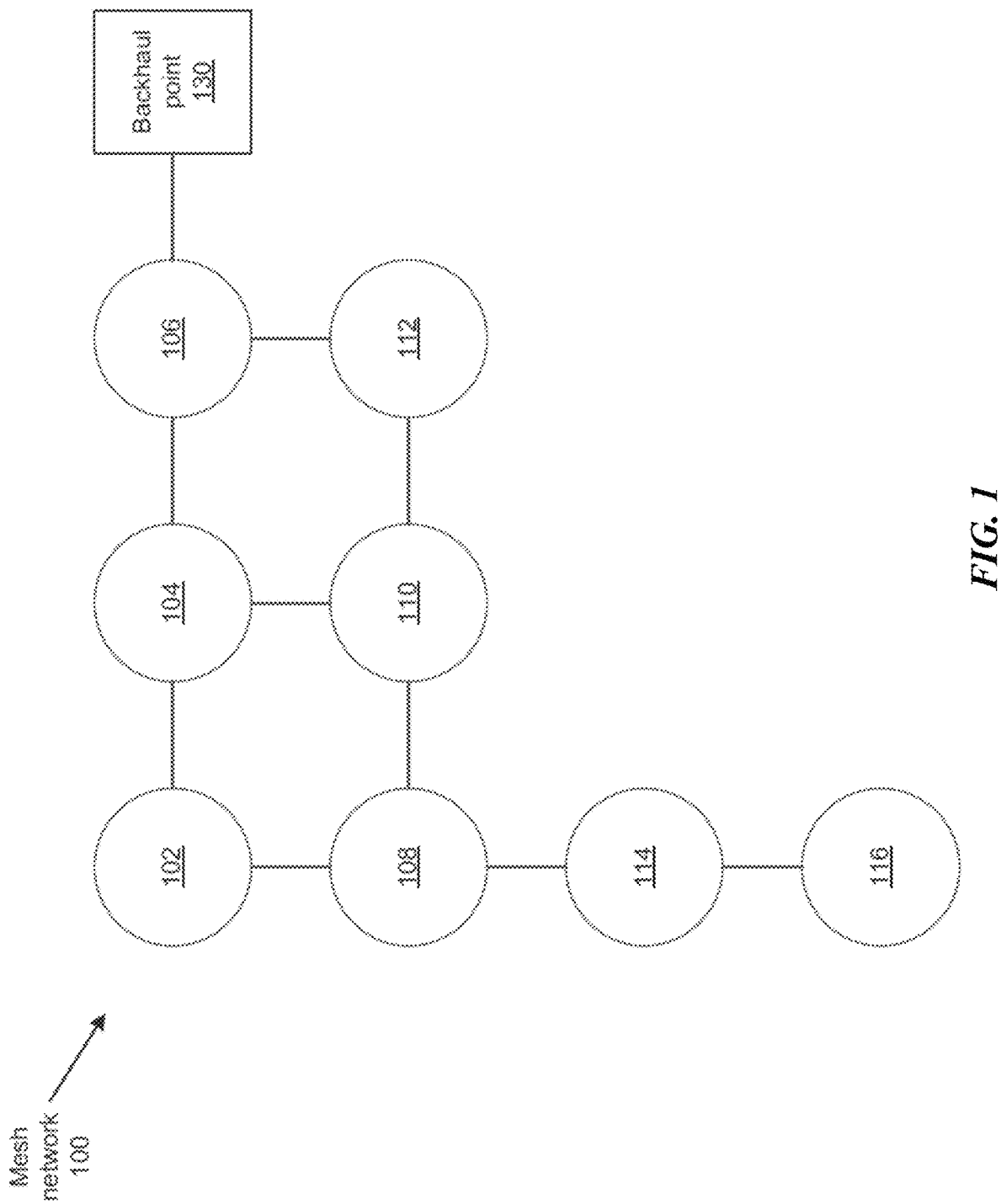
FIG. 1 is a schematic block diagram illustrating one embodiment of a mesh network connected to a backhaul point.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure relates to systems and methods that utilize a base station for content distribution to one or more users. The base station may include both a local storage device and a local processor, and may provide a cell in a network (e.g., cellular network) for use by one or more clients. The base station may also include a content distribution module that stores a local digital content item in the local storage of the base station. A content request module may receive, from a user (e.g., client), a request for a remote digital content item (such as a digital file) that is stored on a remote computing device (such as a server connected to the Internet). A content serving module may be configured to send the local digital content item to the client from the local storage device or other more locally positioned storage device (e.g., another base station in closer proximity than the remote computing device) instead of the remote digital content item from the remote computing device. As a result, the digital content item may be served more quickly, with greater reliability, and with less strain and traffic on the network.

The base station may be positioned on or in at least one of, for example, a cell tower, lamp pole, stadium light post, high rise building, billboard, or residential or commercial building. The base station may be positioned on any structure (e.g., structure that elevates the base station) that assists in sending or receiving wireless signals for transmission of data. The base station may be coupled with other base stations in a mesh network as described in further detail herein. The mesh network may include any combination of wired and wireless transmission methods.

In certain embodiments, the content serving module may look for additional copies of the requested digital content item that are geographically close to the base station. For example, the content serving module may, if the local storage of the requesting user does not have a local copy, identify one or more secondary sources (such as other base stations or other user's storage/processing resources) other than the remote computing device that have a copy of the digital content item. The content serving module may search both a mesh node (e.g., cellular network) as well as end user nodes (e.g., in-home storage/processing devices) to identify available copies of the requested digital content item. The content serving module may estimate a time for serving the remote digital content item from the secondary sources and estimate a time for serving the remote digital content item from the remote computing device. The content serving module may then serve the digital content item from the source with the shortest estimated delivery time.

The base station may be a component in a wireless network such as a cellular network. Other varieties of base station may also benefit from the present invention. A wide range of digital content items may benefit from this approach including, for example, audio-visual files, music/audio files, database files, photo files, and others.

Also disclosed is a method for distributing digital content. The method may involve identifying remote files likely to be accessed by clients of the base station in the future and storing local copies for each identified remote file. Similarly, the method may involve identifying local copies that are unlikely to be accessed by clients of the base station in the future and deleting the identified local copies.

FIG. 1 illustrates one embodiment of a mesh network 100 for distributing content to nodes 102-116. The nodes 102-116 may each include any suitable computing device comprising, for example, computer readable storage media, such as solid state storage devices (SSSD), hard disk drives (HDD), or other. The nodes 102-116 are configured to communicate in a mesh network 100. The nodes 102-116 may be communicatively connected by wired connections such as Ethernet, Fibre Channel, or other network technology using wired connections (whether copper, optical, or other). In other embodiments, the nodes 102-116 comprise radios and wirelessly communicate data using suitable wireless technologies. The nodes 102-116 may use, for example, free-space optical communication (FSO), E band communication, extremely high frequency (EHF) (also known as millimeter wave (MMW) communication), or others, according to suitable protocols. The mesh network 100 may include a mix of wired and wireless connections allowing communication between the nodes 102-116.

In one embodiment, the mesh network 100 includes at least one backhaul point 130. The backhaul point 130 provides a connection to the core network, backbone network, or other section of the telecommunications network and the mesh network 100. The backhaul point 130 may, in one embodiment, be a base station (such as a cell site) in a cellular telecommunications network. As used herein, the term "base station" refers to a component in a network that creates a cell in a network. The base station may, for example, be a cell tower in a cellular network. The backhaul point 130 typically provides high speed access to the network, and connects the nodes 102-116 to a broader network, such as the Internet. In one embodiment, the backhaul point 130 provides a connection using free-space optical communication (FSO). The backhaul point 130 may communicate using the E band range of radio frequencies. The backhaul point 130 may provide a wired or wireless connection.

In certain embodiments, the backhaul point 130 may itself be a node in the mesh network 100. For example, one or more computing devices may be configured to provide the functionality of a node 102-116 and the backhaul point 130. Such a node may have a first radio for communicating with other nodes 102-116 and a second radio for providing backhaul for the mesh network 100.

Figure 2:
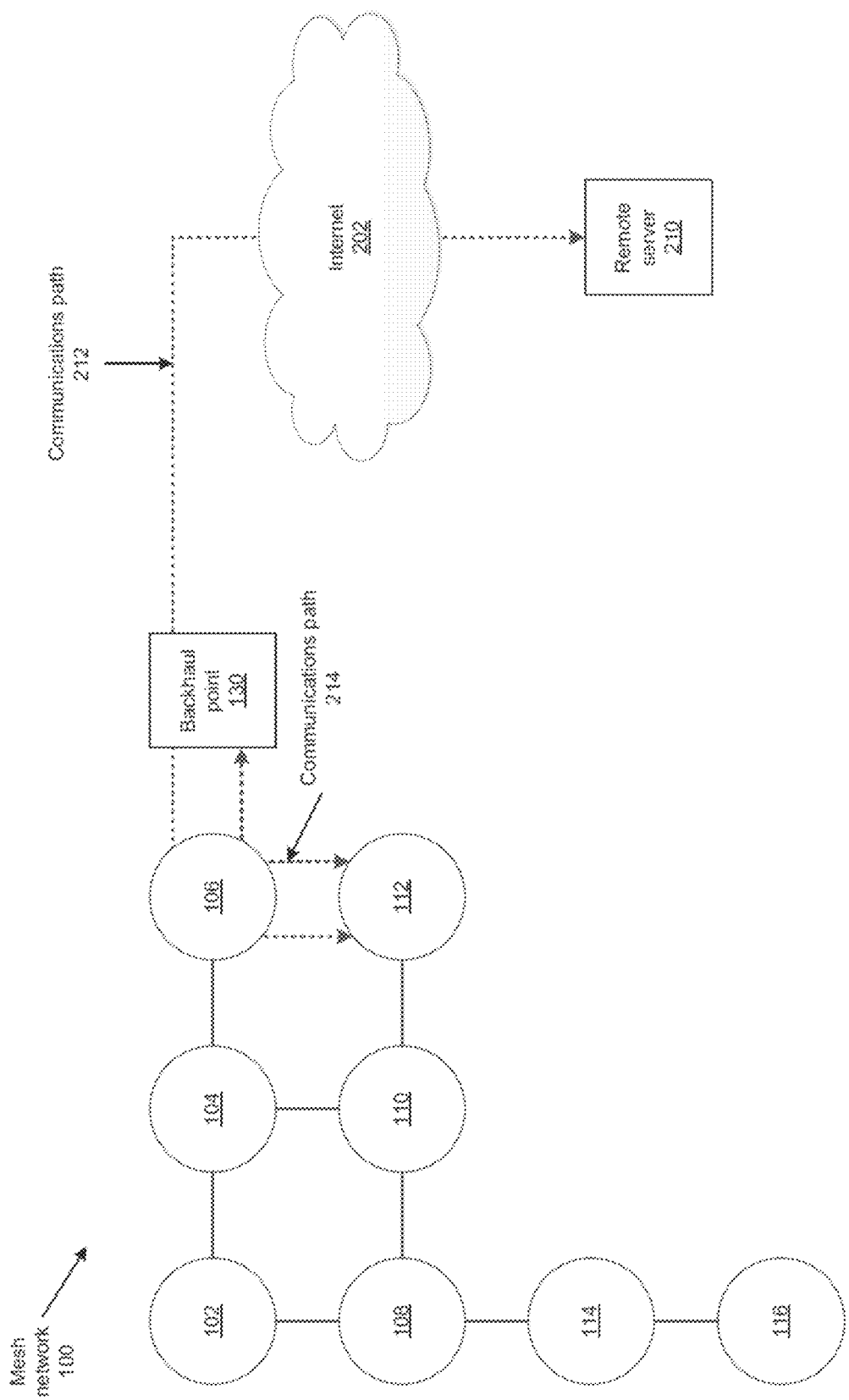
FIG. 2 is a schematic block diagram illustrating one embodiment of a mesh network connected to the Internet and a remote server through the backhaul point.

In one embodiment, the backhaul point 130 may be provided with a storage device and processor for storing and serving digital content items to nodes 102-116 in the mesh network 100. In a typical environment, the backhaul point 130 simply serves as a data pipe, relaying information to and from the other networks. For example, a base station in a cellular network (such as a cell tower) relays information and participates in maintaining connectivity for mobile devices, but it does not store and serve digital content items. FIG. 2 illustrates a communications path 212 that is used in a typical network, where the node 112 requests a particular digital content item (such as a movie) from a remote server 210 connected to the Internet 202. The request is received by the node 106 and forwarded to the backhaul point 130. The backhaul point 130 then forwards the request through the Internet 202 to the remote server 210, which responds by serving the requested digital content item.

In contrast, the backhaul point 130 may be provided with a content apparatus (described in greater detail below) for storing and serving digital content items to nodes 102-116 in the mesh network 100. Referring again to FIG. 2, the improved approach follows communications path 214. The request is received by the node 106, and forwarded to the backhaul point 130. Rather than simply forward the request to the remote server 210 and allow the remote server 210 to send the digital content item, the content apparatus may determine whether the backhaul point 130 has a local copy of the requested digital content item on its local storage device. If the backhaul point 130 has a local copy, the backhaul point 130 may serve the local copy of the digital content item to the node 112 (via the node 106) rather than have the remote server 210 serve the requested copy. As a result, backhaul traffic (and traffic over the Internet) is reduced since the digital content item does not need to be transmitted over the Internet 202 to the backhaul point 130. In addition, the digital content item may be provided more quickly and more reliably given the shorter distance and fewer possible points of failure. Such an embodiment may further reduce the processing required by the remote server 210, making the remote server 210 more robust and less likely to be overloaded.

While the above example illustrates a digital content item that is a movie, the phrase "digital content item" refers to any variety of digital information. For example, the digital content item may be an audio file, a picture file, a database file, a flat file, or other.

Figure 3:
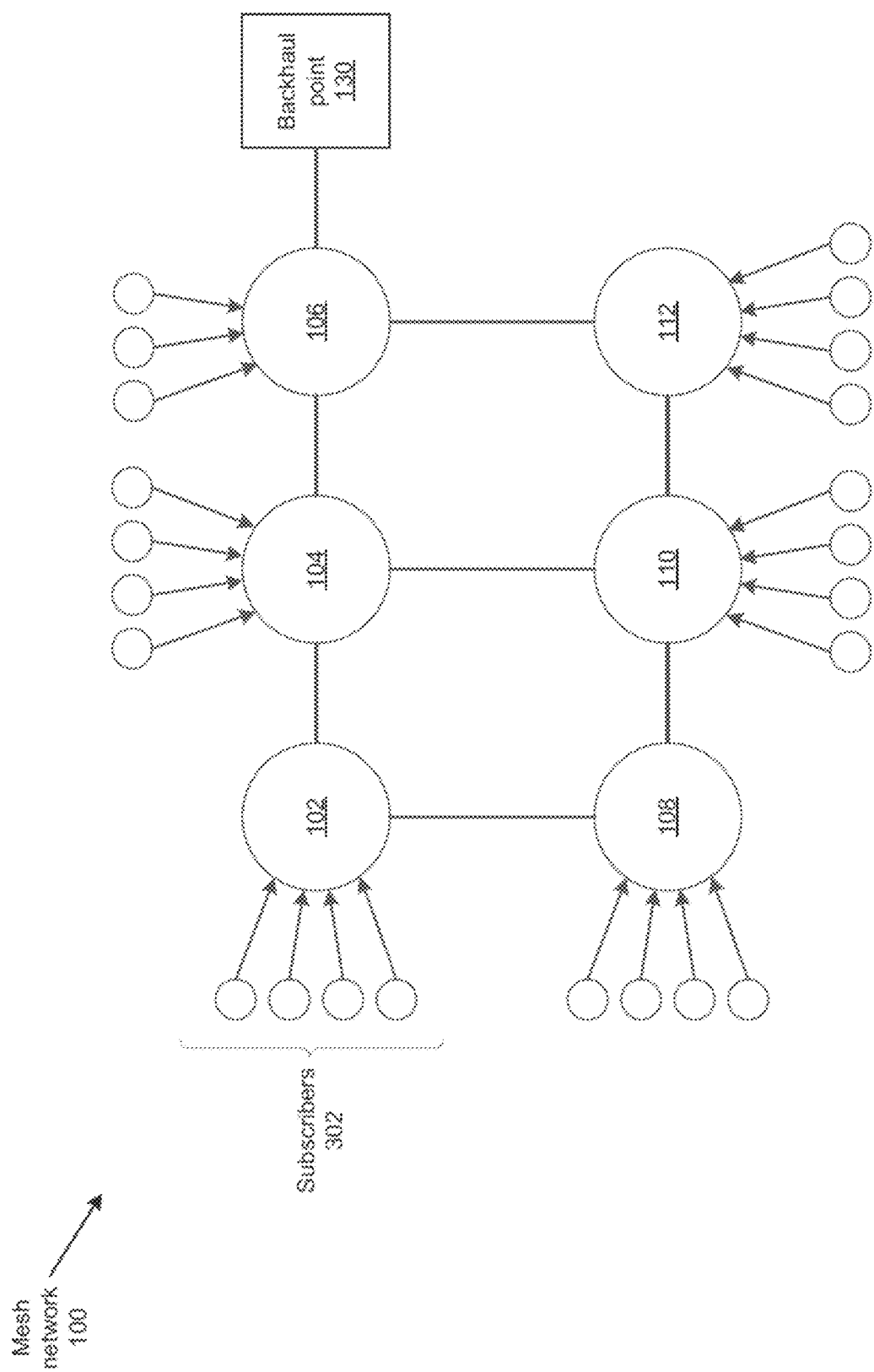
FIG. 3 is a schematic block diagram illustrating one embodiment of a mesh network connecting multiple Internet subscribers to a backhaul point.

FIG. 3 illustrates one embodiment of a mesh network 100 where each node 102-112 is associated with one or more subscribers 302. Such an embodiment may be implemented by an Internet Service Provider (ISP) who provides the nodes 102-112 and connects the subscribers 302 to the ISP's service. The ISP may lease or sell hardware to the subscribers 302 allowing each subscriber 302 to connect one or more computing devices to a node 102-112. In one embodiment, the subscribers 302 are provided with a subscriber hardware unit to which the subscribers 302 may communicatively connect their devices, and which also communicates with an associated node (such as the node 102). The subscriber hardware unit may, for example, connect to the node 102-112 using Wi-Fi. In the embodiment shown in FIG. 3, each subscriber 302 may have a subscriber hardware unit that is situated at the location of the subscriber 302 (such as a residence or place of business). In one embodiment, each subscriber location may have its own node 102-112. In other embodiments, such as the one shown in FIG. 3, one node 102-112 may be placed in range of multiple subscriber 302 locations.

In one embodiment, the nodes 102-112 may be configured to operate in the high frequency range for communicating over distances of between 200 and 400 meters, and in the low frequency range for distances less than 250 meters. The mesh network 100 may use orthogonal frequency-division multiplexing (OFDM) for communications. Each node 102-112 may be configured with multiple antennas and may use multiple-input multiple-output (MIMO) technology to increase data throughput and link range. The nodes 102-112 may operate within the 5 GHz frequency band, or other suitable frequency band. Each node 102-112 may comprise a phased array of antennas to facilitate beam forming and communication between the nodes 102-112.

Figure 4:
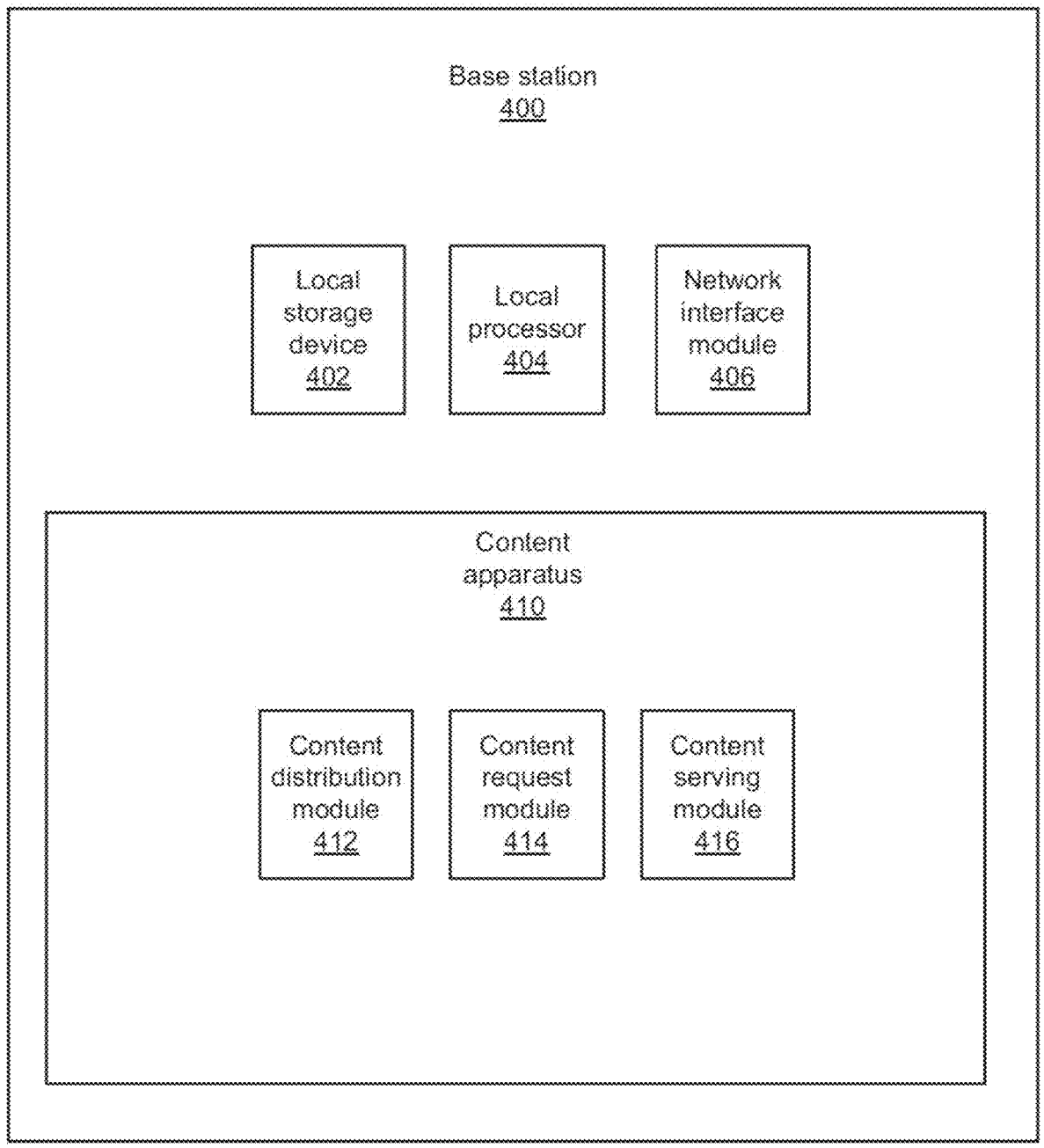
FIG. 4 is a schematic block diagram illustrating one embodiment of a base station comprising a local storage device, a local processor, and a content apparatus.

FIG. 4 illustrates one embodiment of a base station 400. The base station 400 may be a cell site in a cellular network, such as a cell tower, other variety of base transceiver station (BTS), or other base station 400 in a cellular network (whether GSM or otherwise). The base station 400 may communicate with one or more computing devices such as cellular phones, tablet computers, and others. The base station 400 may provide connection to the Internet to subscribers using the base station 400, allowing subscribers to download various digital content items.

The base station 400 may be configured with a local storage device 402 and a local processor 404. The local storage device 402 may be a SSD, an HDD, or other suitable storage medium. In a preferred embodiment, the local storage device 402 comprises at least terabytes of storage for storing digital content items. The local processor 404 may be configured to facilitate determining whether the local storage device 402 comprises a local copy of a requested digital content item and for determining how to serve the requested digital content item to a client. The base station may also include a network interface module 406 configured to communicatively connect a client of the base station 400 to a remote computing device (such as a server) that has a remote digital content item requested by the client. The term "network interface module" is used broadly to refer to software, hardware, firmware, and other components that allow a base station 400 to facilitate communications by a client of the base station 400 with other devices over the cellular network.

The base station 400 may also include a content apparatus 410. While the content apparatus 410 is shown separate from the local storage device 402 and the local processor 404 for ease of illustration, the content apparatus 410 may include software that is stored in the local storage device 402 and that is executed by the local processor 404. The content apparatus 410 may also include hardware, firmware, software stored on computer readable media, or a combination thereof.

The content apparatus 410 may include a content distribution module 412 that is configured to store a local copy of a digital content item (which may also be referred to as a local digital content item) in the local storage device 402 of the base station 400. The content distribution module 412 may be configured to request a particular digital content item that the content distribution module 412 determines is likely to be requested in the future. For example, in one embodiment, the content distribution module 412 tracks the frequency with which a particular digital content item is requested and served to clients of the base station 400. Once a threshold number of requests are received within a predefined period of time, the content distribution module 412 may determine that the particular digital content item is likely to be requested again in the near future. The content distribution module 412 may then generate a request for the digital content item and store it in the local storage device 402.

In other embodiments, the content distribution module 412 is configured to receive digital content items that are pushed to the content distribution module 412. For example, when a newly-released movie is made available for digital download, a remote server may push a copy of the digital download to the content distribution module 412, which then saves the digital download in the local storage device 402.

The digital content items stored by the content distribution module 412 may be tailored to the particular location of the base station 400. For example, the base station 400 may store in the local storage device 402 frequently-requested digital content items associated with the base station 400's location, such as a weather forecast. The base station 400 may further store digital content items relevant to local businesses and services in geographic proximity with the base station 400.

The content request module 414 may be configured to receive, from a client of the base station 400, a request for a remote digital content item that is stored on a remote computing device. For example, a user of a smart phone may request that a song (e.g., audio file) be streamed from a remote server. The content request module 414 may identify the remote digital content item and determine whether or not the local storage device 402 comprises a local copy of the remote digital content item. For example, the content request module 414 may identify the song based on its file name and determine whether the local copy of the song is stored on the local storage device 402.

The content serving module 416 is configured to send the local digital content item to the client from the local storage device 402 instead of the remote digital content item if the content request module 414 determines that the local storage device 402 has a local copy of the remote digital content item. To continue the example above, the content serving module 416 may serve the local copy of the song to the client instead of having the remote server serve the remote copy of the song. If the local storage device 402 does not have a local copy, the content serving module 416 may cause the digital content item to be served by the remote computing device in accordance with traditional processes.

In certain embodiments, the content serving module 416 may be further configured to determine alternative sources if the local storage device 402 does not include a local copy of the requested, remote digital content item. The content serving module 416 may identify one or more secondary sources other than the remote computing device that stores the remote digital content item. For example, the content serving module 416 may identify a nearby base station in communication with the base station 400 that has a local copy of the digital content item in its local storage. The content serving module 416 may estimate a time for serving the remote digital content item from the secondary source and estimate a time for serving the remote digital content item from the remote computing device identified in the client's request. The content serving module 416 may then serve the remote digital content item from the source with the shortest estimated time.

In certain embodiments, if the content request module 414 determines that the local storage device 402 does not have a local copy of the digital content item, the content request module 414 may request the digital content item and store a local copy for future use. The content request module 414 may be configured to implement a caching algorithm for determining which digital content items to request and store, and which local copies of the digital content items to delete from the local storage device 402 and when to carry out such deletions. A similar caching algorithm may be used to delete secondary copies of digital content items stored on secondary storage devices such as storage devices of other base stations in the mesh network 100.

In certain embodiments, the operations and functionality of any one of content distribution module 412, content request module 414, and content serving module 416 may be carried out by the other of modules 412, 414, 416, alone or in any combination.

As described above, base station 400 may be positioned on or in at least one of, for example, a cell tower, lamp pole, stadium light post, high rise building, billboard, or residential or commercial building. Base station 400 may be positioned on any structure (e.g., structure that elevates the base station) that assists in sending or receiving wired or wireless signals for transmission of data.

Figure 5:
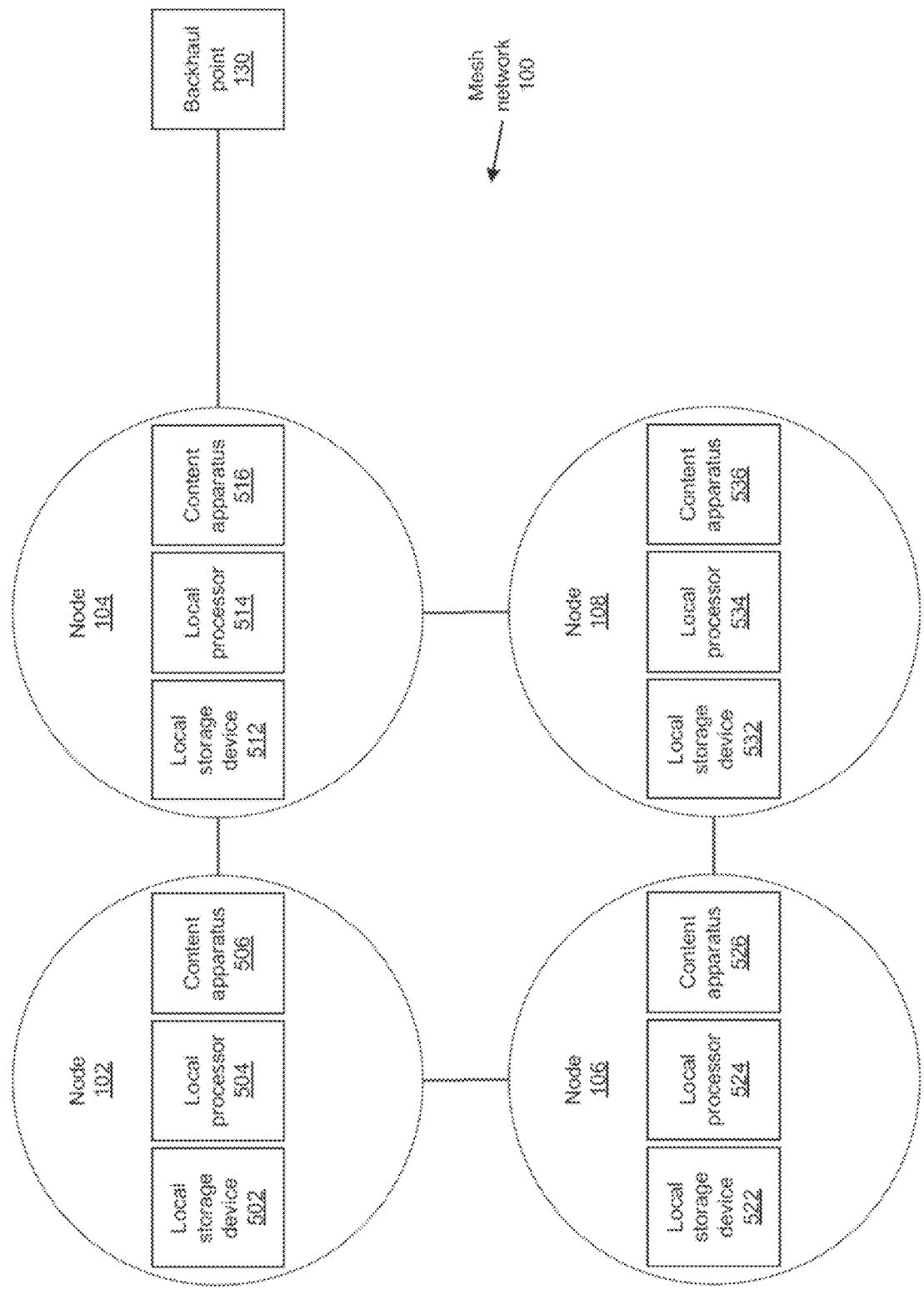
FIG. 5 is a schematic block diagram illustrating one embodiment of a mesh network where the nodes comprise local storage devices, local processors, and content apparatus.

FIG. 5 illustrates another embodiment of a mesh network 100 comprising nodes 102-108. The nodes 102-108 each include respective local storage devices, local processors, and content apparatus. The mesh network is further connected to a backhaul point 130. The backhaul point 130 may also include a local storage device 512, local processor 514, and content apparatus 516. Each node 102-108 may also implement a mesh network module (not shown) configured to communicatively connect the node to the other nodes in the mesh network. In one embodiment, the mesh network 100 is a wireless mesh network 100.

The content apparatus 506 may be configured to receive, from a client communicatively connected to the first node, a request for a remote digital content item from a remote computing device. As used herein, a remote computing device refers to a computing device that is not a node in the mesh network 100 and that is not the backhaul point 130. The content apparatus 506 may determine if the local storage device 502 has a local copy of the remote digital content item and may serve the local copy of the remote digital content item to the client from the local storage device 502 if the local storage device 502 has the local copy.

In one embodiment, the node 102 may include a local network module. Node 102 may be located at or cooperate with one or more base stations 400 described herein. Node 102 (or any of the other nodes 104-108) may include storage/processing devices within one or more homes or businesses. The local network module may be configured to determine if one of the other nodes 104-108 in the mesh network 100 has a local copy of the remote digital content item. The local copy on another node may be referred to as a second local copy, or a network local copy, to distinguish the local copy on another node from a local copy on the node 102. If the content apparatus 506 determines that the local storage device 502 does not have a local copy of the remote digital content item, and the local network module determines that the node 108 has a second local copy, the local network module may serve the second local copy to the client instead of having the remote computing device serve the remote digital content item.

The content apparatus 506 may also include a cache module that implements a cache of remote digital content items on the local storage device 502 of the first node 102 for one or more clients of the first node 102. The cache module may implement any of a variety of caching algorithms for determining which remote digital content items to store locally, and which local copies to delete from the local storage device 502.

In one embodiment, at least one node 102-108 in the mesh network 100 implements a network cache module and caches remote digital content items on the local storage device of that particular node on a network level. Thus, the network cache module may implement a cache for all nodes 102-108 in the mesh network 100. In one embodiment, the network cache module is distributed across one or more of the nodes 102-108 such that no single node is responsible for the network cache.

Similarly, one or more of the nodes 102-108 may be virtualized such that the separate local storage device 502, 512, 522, and 532 are logically a single storage device. In such an embodiment, each node 102-108 may have access to local digital content items stored on the local storage devices 502, 512, 522, and 532 of the other nodes 102-108 in the mesh network 100.

Figure 6:
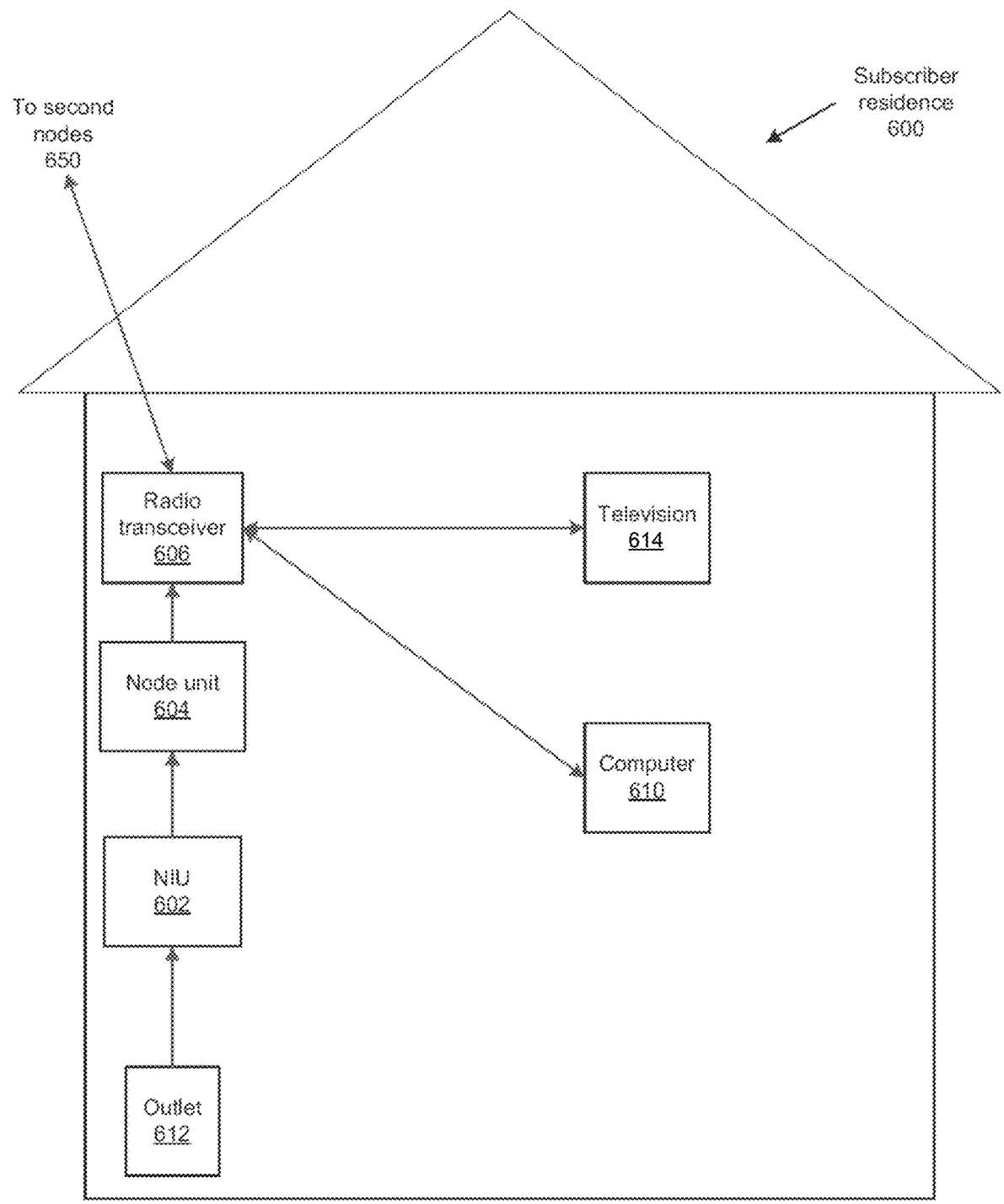
FIG. 6 is a schematic block diagram illustrating one embodiment of a node set up within a subscriber residence.

FIG. 6 illustrates one embodiment of a subscriber residence 600 where the mesh network is provided by an ISP. The ISP may install a network interface unit (NIU) 602 on the premises. The NIU 602 may be installed internal to the subscriber residence 600 or external to the subscriber residence 600. The NIU 602 may, in one embodiment, have a battery backup. The NIU 602 may be connected to the node unit 604 and allow the node unit to use the NIU 602 battery backup in event of a power failure for the node unit 604. While FIG. 6 illustrates the NIU 602 connecting to an outlet 612, in other embodiments, the node unit 604 connects to the outlet 612.

The node unit 604 includes a local storage device and a local processor as described above. The node unit 604 may also include a power supply unit for powering the node unit 604. The node unit 604 may also provide power to a radio transceiver 606. The radio transceiver 606 allows communications between the node unit 604 and other computing devices. In certain embodiments, the radio transceiver 606 is located within the same casing as the node unit 604. In other embodiments, the radio transceiver 606 is external to the node unit 604.

While FIG. 6 illustrates a radio transceiver 606, in other embodiments, the node unit 604 connects with other second nodes 650 using wired connections. In one embodiment, the node unit 604 may be installed with a radio transceiver 606 and the connection may later be changed to a wired connection such as an optical or electrical connection. In such a situation, the radio transceiver 606 may be left after the change to provide redundancy and/or an additional channel of communication.

The radio transceiver 606 may also facilitate communication between the node unit 604 and other computing devices within the subscriber residence such as a television 614 and a computer 610. In certain embodiments, the node unit 604 may use one radio transceiver 606 for communicating with the second nodes 650, and another radio transceiver 606 for communicating with the computing devices of the subscriber.

The node unit 604 may be a stand-alone unit, or may be integrated into another component such as a gaming console, a computer, a television, or other appropriately configured device. The node unit 604 networks with other second node units 650 to form a wireless mesh. The node units may form a grid, and may be configured to store digital content items and serve them to the computing devices within the subscriber residence 600 as described above. In certain embodiments, each subscriber residence 600 is provided with a node unit 604. In other embodiments, one node unit 604 may be sufficient to serve multiple subscriber residences 600.

Such a distributed computing platform may be scalable to petabytes of storage and petaflops of processing. The node unit 604 may make use of E band transceivers created in silicon, allowing low cost short range gigabit radios. The radios may be used to form a mesh network comprising many computing nodes, as described above.

The node unit 604 may form multiple point-to-point connections with second nodes 650, or it may point-to-multipoint connections with the second nodes 650. The subscriber residence 600 may be outfitted with a high-frequency mesh radio such as MMW, MW, or FSO. The subscriber residence 600 may be further outfitted with a broadcast radio using 802.11x, or other appropriate approach to communications. The broadcast radio may be located inside or outside the premises.

In traditional distributed storage systems, such as peer-to-per storage, the user determines what files to store on the particular node unit 604. This leads to many copies of the same file being unnecessarily stored and consuming resources. In contrast, the above-described system may be used such that the group of nodes form a collective and are controlled by software that determines the most efficient manner of storage, distribution, and processing, for a given task. Thus, the subscriber is not responsible for these tasks and determinations.

The storage resources may be partitioned in to two categories: core storage and response storage. Core storage may be more permanent storage, while the response storage accommodates flash demands used, for example, for a popular requested file. The response storage may function like a cache.

Figure 7:
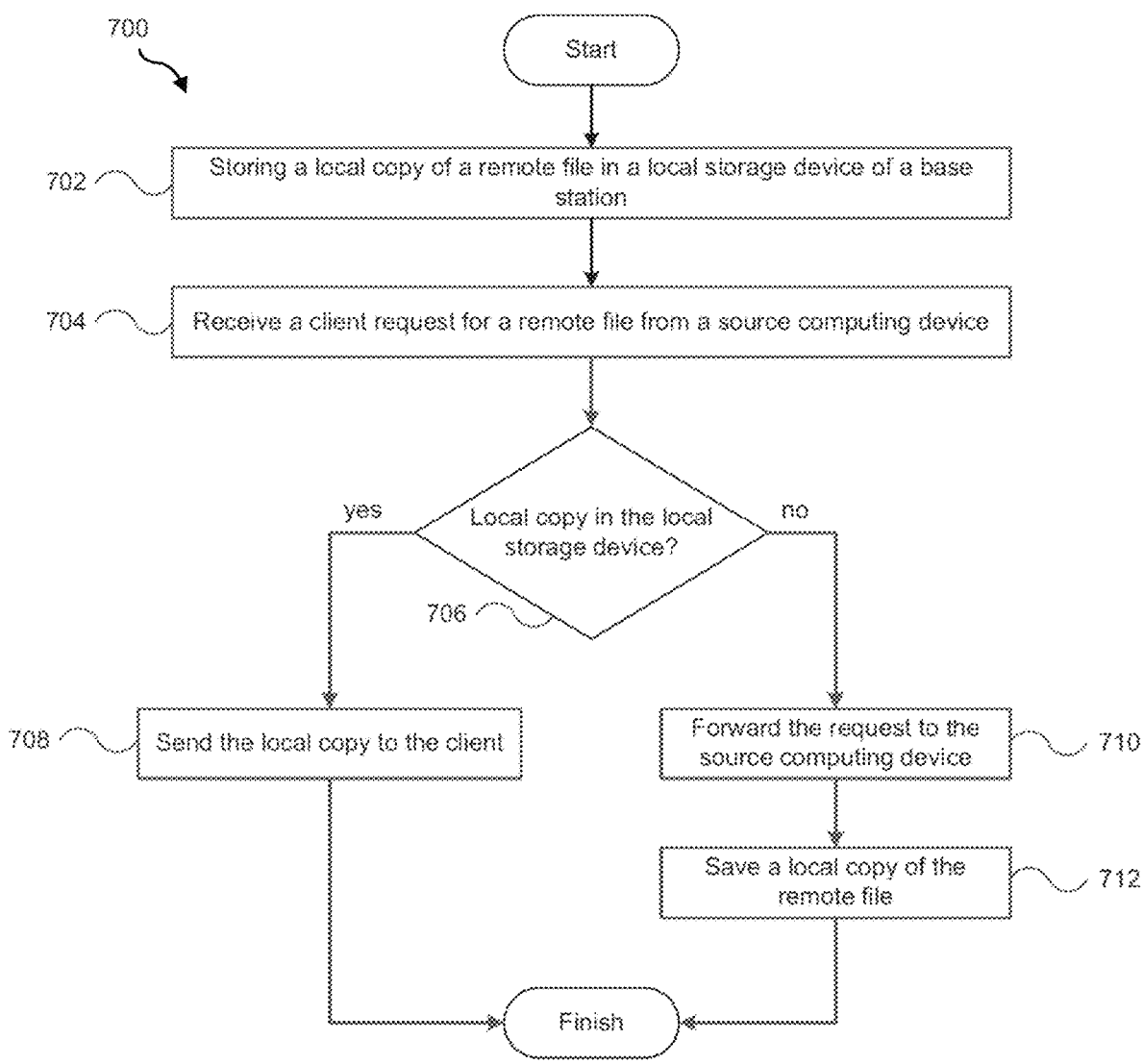
FIG. 7 is a schematic flow chart diagram illustrating one embodiment of a method for serving a file to a client from a base station.

FIG. 7 illustrates one embodiment of a method 700 for providing content in a content distribution network. The method 700 may begin, at block 702, with storing a local copy of a remote file in a local storage device of a base station. The base station may serve a cellular network. In other embodiments, a local copy is stored in the local storage device of a node in a mesh network. The remote file may be a file that is available from a remote source computing device on the Internet.

The method 700 may also involve, at block 704, receiving a client request for the remote file from the source computing device. The request may be made according to the Internet protocol suite commonly referred to as TCP/IP. In other embodiments, different protocols may be used. The base station may be a device that is guaranteed to be in the path of the client and the source computing device such that the base station may intercept the request and analyze the request.

The method may involve, at block 706, determining whether a local copy of the remote file is stored in the local storage device. The local storage device may include local copies of many different remote files. Various approaches to determining the identity of the requested file, and determining whether the local storage device has a local copy of the requested file, may be used.

If the local storage device has a local copy of the requested file, the method may involve, at block 708, sending the local copy to the client instead of forwarding the request to the source computing device. If the local storage device does not have a local copy of the requested file, the method may involve, at block 710, forwarding the request to the source computing device such that the source computing device serves the remote copy of the file. The method 700 may involve, at block 712, saving a local copy of the remote file.

In certain embodiments, the base station (or node) may coordinate with the source computing device to serve either the local copy or the remote copy of the requested file. In one embodiment, the base station forwards the request to the source computing device and the source computing device determines whether or not the base station has a local copy of the requested file. If the base station has a local copy, the source computing device may instruct the base station to serve the local copy to fulfill the request. The source computing device may also store information about other base stations that have a local copy, and many instruct the other base station to serve the local copy to the client instead.

Thus, in certain embodiments, the responsibilities for determining whether the base station includes a local copy and where to serve the file from may be shared among multiple computing devices within the system. In such an embodiment, the base station may determine whether it has a local copy by examining a message from the source computing device indicating whether or not it has a local copy. In such an embodiment, the source computing device may be responsible for identifying the file and identifying whether the base station has a local copy in its local storage. While the above discussion references base stations, it may be equally applicable to nodes in a mesh network.

Figure 8:
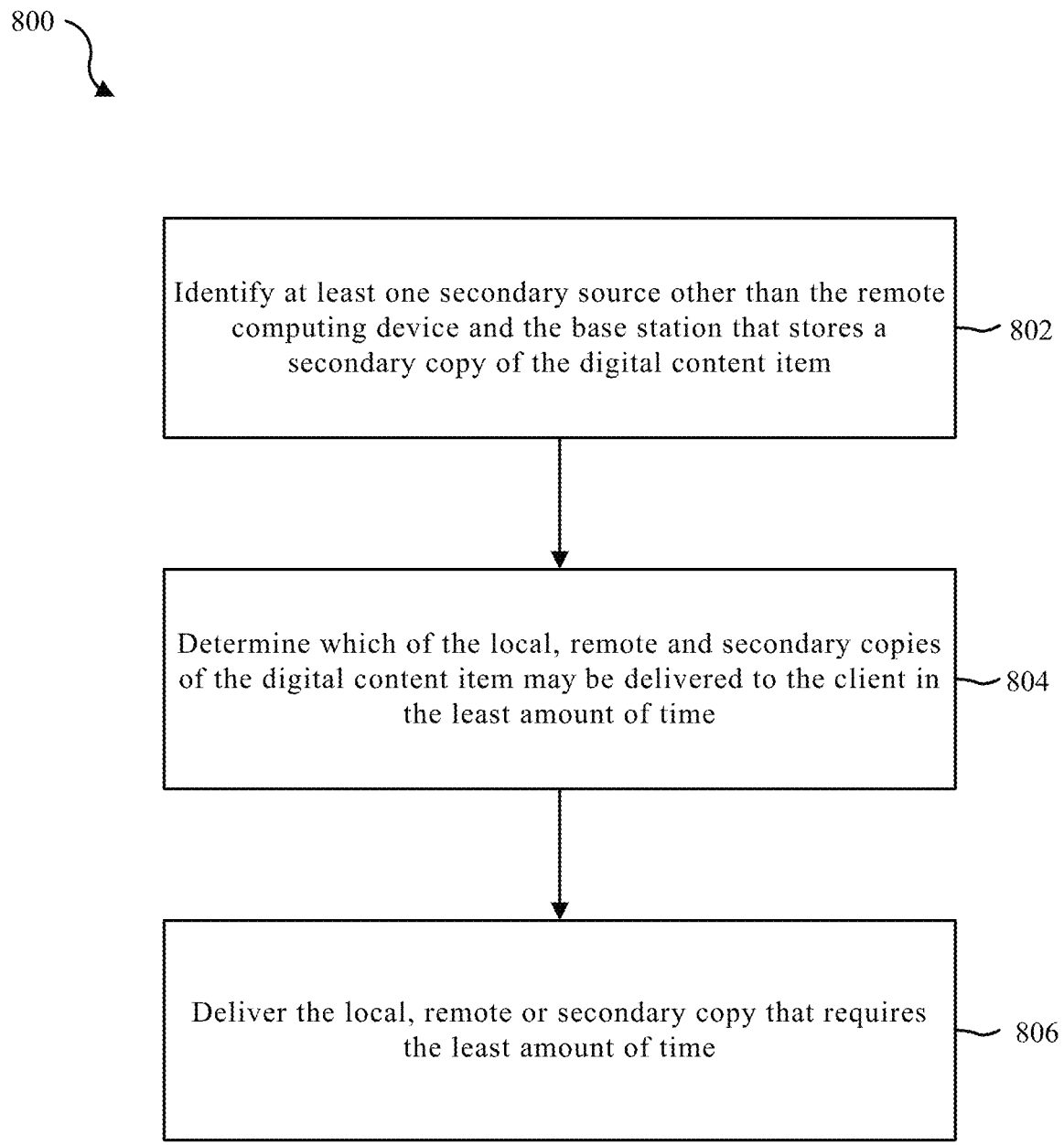
FIG. 8 is a schematic flow chart diagram illustrating one embodiment of a method for serving a file to a client from a base station.

FIG. 8 illustrates one embodiment of a method 800 for providing content in a content distribution network. The method 800 may begin, at block 802, with identifying at least one secondary source other than the remote computing device and the base station that stores a secondary copy of the digital content item. The base station includes a local copy of the digital content item and the remote computing device includes a remote copy of the digital content item. The base station may serve a cellular network and may include, for example, a cellular tower. At block 804, the method 800 includes determining which of the local, remote and secondary copies of the digital content item may be delivered to the client in the least amount of time. Method 800 may also include at block 806 delivering the local, remote or secondary copy that requires the least amount of time.

Figure 9:
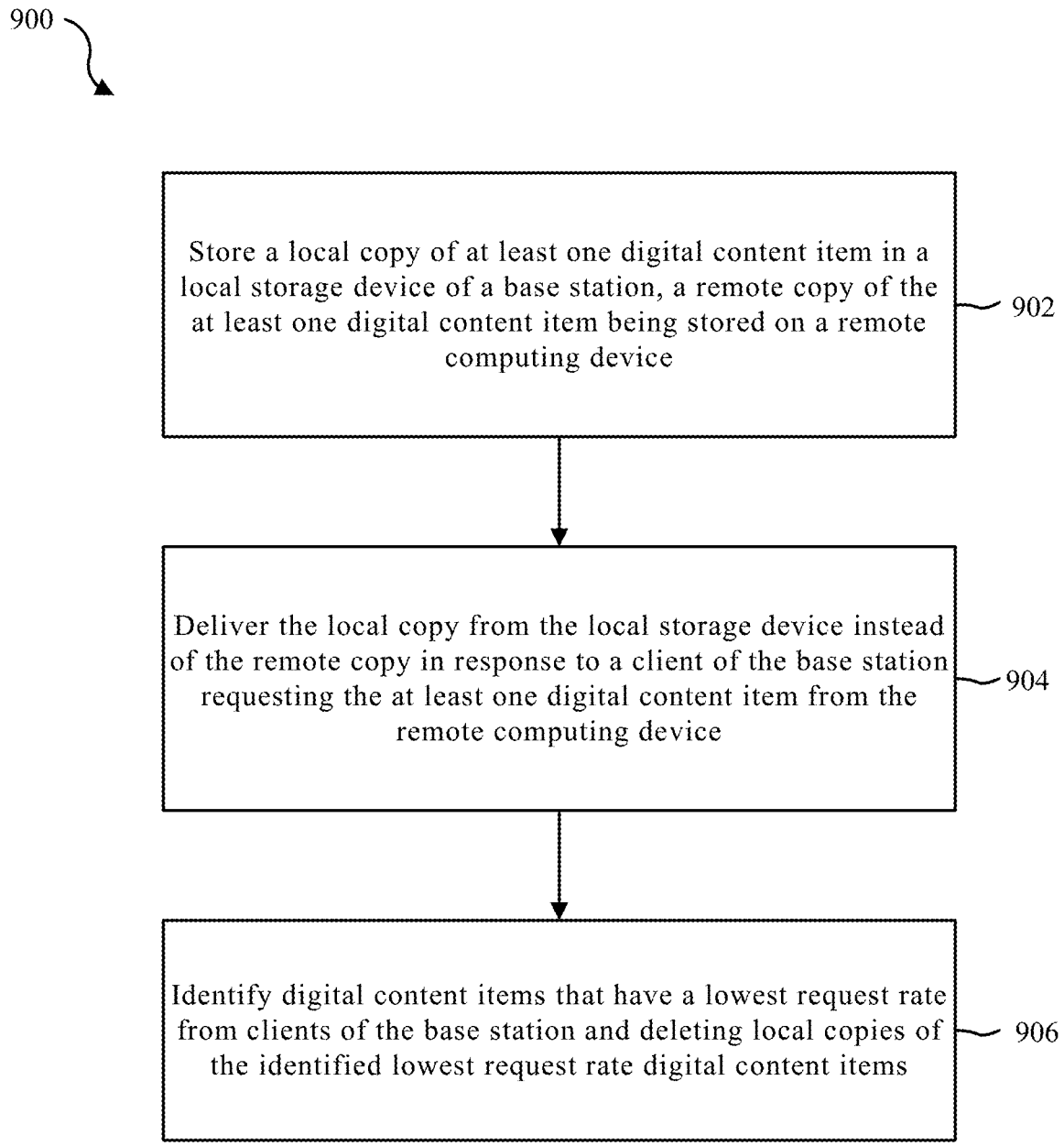
FIG. 9 is a schematic flow chart diagram illustrating one embodiment of a method for serving a file to a client from a base station.

FIG. 9 illustrates one embodiment of a method 900 for providing content in a content distribution network. The method 900 may begin, at block 902, with storing a local copy of at least one digital content item in a local storage device of a base station, a remote copy of the at least one digital content item being stored on a remote computing device. Block 904 includes delivering the local copy from the local storage device instead of the remote copy in response to a client of the base station requesting the at least one digital content item from the remote computing device. Block 906 of method 900 includes identifying digital content items that have a lowest request rate from clients of the base station and deleting local copies of the identified lowest request rate digital content items.

Figure 10:
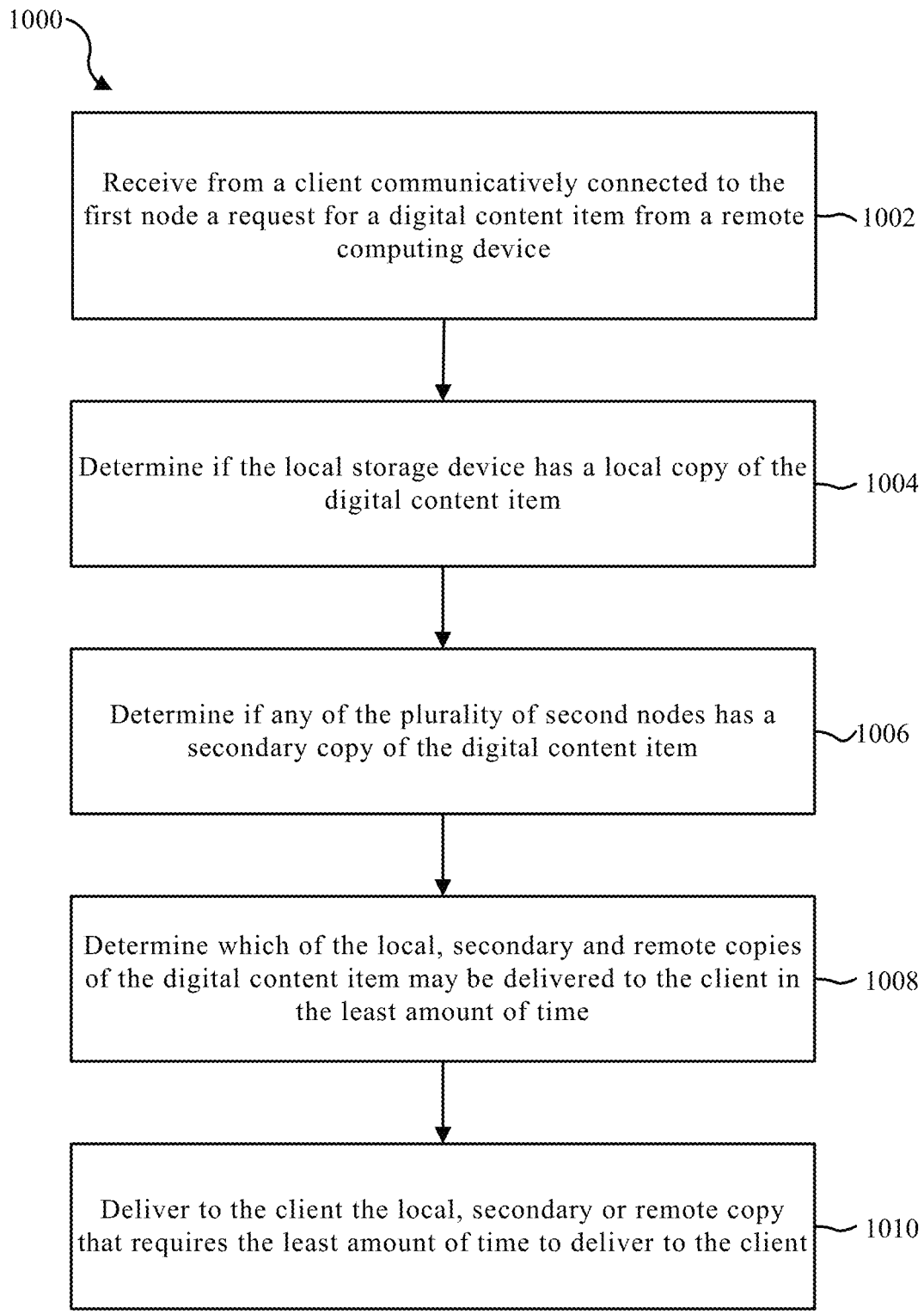
FIG. 10 is a schematic flow chart diagram illustrating one embodiment of a method for serving a file to a client from a base station.

FIG. 10 illustrates one embodiment of a method 1000 for providing content in a content distribution network. The method 1000 may begin, at block 1002, with receiving from a client communicatively connected to the first node a request for a digital content item from a remote computing device. Block 1004 includes determining if the local storage device has a local copy of the digital content item. Block 1006 of method 1000 includes determining if any of the plurality of second nodes has a secondary copy of the digital content item. Block 1008 includes determining which of the local, secondary and remote copies of the digital content item may be delivered to the client in the least amount of time. Block 1010 includes delivering to the client the local, secondary or remote copy that requires the least amount of time to deliver to the client.

Figure 11:
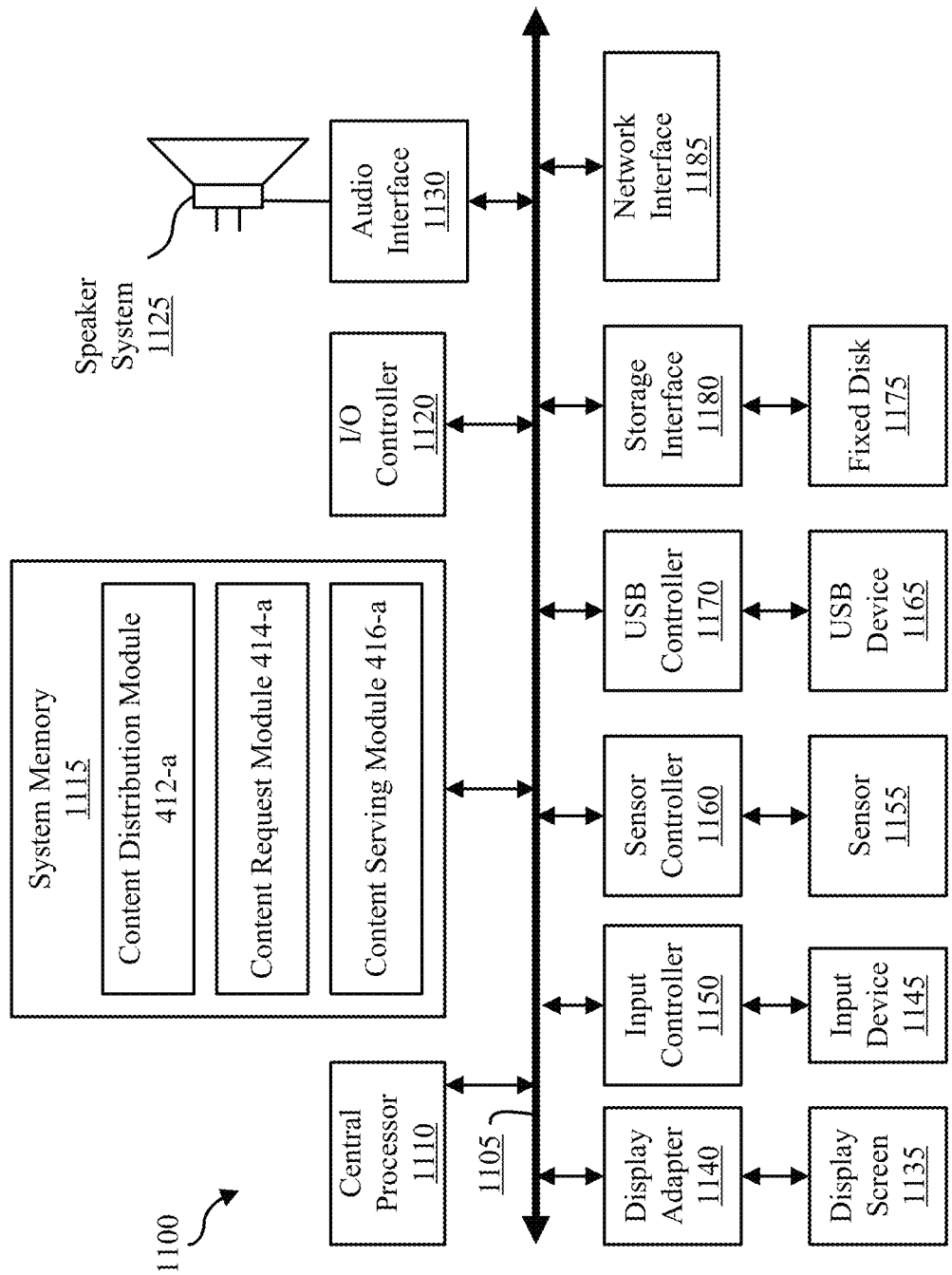
FIG. 11 is a block diagram of a computer system suitable for implementing the present systems and methods of FIGS. 1-10.

FIG. 11 depicts a block diagram of a controller 1100 suitable for implementing the present systems and methods. The controller 1100 may be an example of the local processor 404 and/or the computer 610 illustrated in FIG. 3. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), and a storage interface 1180. Also included are at least one sensor 1155 connected to bus 1105 through a sensor controller 1160 and a network interface 1185 (coupled directly to bus 1105).

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a content distribution module 412-*a*, content request module 414-*a*, and/or content serving module 416-*a* to implement the present systems and methods may be stored within the system memory 1115. The content distribution module 412-*a* may be an example of the content distribution module 412 illustrated in FIG. 4. The content request module 414-*a* may be an example of the content request module 414 illustrated in FIG. 4. The content serving module 416-*a* may be an example of the content serving module 416 illustrated in FIG. 4. Applications resident with controller 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via interface 1185.

Storage interface 1180, as with the other storage interfaces of controller 1100, can connect to a standard computer readable medium for storage and/or retrieval of information, such as a fixed disk drive 1175. Fixed disk drive 1175 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1100 wirelessly via network interface 1185.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on controller 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A system comprising:
    a first base station comprising a local storage device and a local processor, the first base station providing a cell in a wireless communications cellular network for one or more clients communicatively connected to the first base station;
    a second base station communicatively connected to the first base station and comprising a second local storage device and a second local processor;
    a content requestor to receive, over the wireless communications cellular network and from a client of the one or more clients, a request for a remote copy of a digital content item being stored on a remote computing device;
    a content distributor to:
        track a frequency with which the digital content item is requested;
        in response to determining that the frequency satisfies a threshold for a predefined period of time, generate a request for the digital content item; and
        store the digital content item in one of the first and second local storage devices; and
    a content server of the first base station or the second base station to:
        determine whether each of a plurality of secondary sources stores a secondary copy of the digital content item at least one of the second base station or the first base station, the plurality of secondary sources comprising a mesh node of the wireless communications cellular network and a storage or processing device within a location of a client of the one or more clients;
        identify a secondary source of the plurality of secondary sources other than the remote computing device that stores a secondary copy of the digital content item at one or both of the second base station or the first base station;
        determine which of the first base station, the remote computing device, or the second base station is capable of delivering the digital content item to the client in a least amount of time by estimating times for delivering the digital content to the client from at least one of the first base station, the remote computing device, or the second base station; and
        deliver, over the wireless communications cellular network, the digital content item to the client from the first base station, the remote computing device, or the second base station that requires the least amount of time.

2. The system of claim 1, further comprising a content distributor to store a local copy of the digital content item in the local storage device of the first base station, wherein the storing is based at least in part on the digital content item being associated with a geographic location of the first base station.

3. The system of claim 2, wherein the digital content item is frequently requested and associated with at least one of a weather forecast of, a local business in, or service provided in a geographic proximity of the first base station.

4. The system of claim 2, wherein the content distributor is further configured to receive additional digital content items from at least one remote computing device and to store the additional digital content items in the local storage device of the first base station.

5. The system of claim 2, wherein the content distributor is further configured to request the digital content item from the remote computing device and store the digital content item on the local storage device as the local copy for future use.

6. The system of claim 2, wherein the content server is further to confirm that the remote copy is available at the remote computing device and confirm that the local copy is available at the local storage device.

7. The system of claim 1, wherein the secondary source comprises at least one additional base station.

8. The system of claim 1, wherein the second base station is a backhaul point in the wireless communications cellular network.

9. The system of claim 1, wherein the second base station provides an internet connection in the wireless communications cellular network.

10. The system of claim 1, wherein the digital content item is one of an audio file, a music file, a video file, a database file, or a picture file.

11. A method for distributing digital content, comprising:
    tracking a frequency with which a digital content item is requested over a wireless communication cellular network;
    in response to determining that the frequency satisfies a threshold for a predefined period of time, generating a request for the digital content item;
    storing a local copy of the digital content item in a local storage device of a first base station, the first base station providing a cell in the wireless communications cellular network for one or more clients communicatively connected to the first base station, wherein a remote copy of the digital content item is stored on a remote computing device;
    storing a secondary copy of the digital content item in a second storage device of a second base station communicatively connected to the first base station;
    determining, whether each of a plurality of secondary sources stores a secondary copy of the digital content item at least one of the second base station or the first base station, the plurality of secondary sources comprising a mesh node of the wireless communications cellular network and a storage or processing device within a location of a client of the one or more clients;

identifying a secondary source of the plurality of secondary sources other than the remote computing device that stores a secondary copy of the digital content item at least one of the second base station or the first base station;

determining, by a content server of the first base station or the second base station, which of the first base station, the remote computing device, or the second base station is capable of delivering the digital content item to a client of the one or more clients in a least amount of time by estimating times for delivering the digital content to the client from at least one of the first base station, the remote computing device, or the second base station; and delivering the digital content item from the first base station, the remote computing device, or the second base station that requires the least amount of time.

12. The method of claim 11, further comprising:
identifying digital content items that have a lowest request rate from clients of the first base station and deleting local copies of the identified lowest request rate digital content items.

13. The method of claim 11, further comprising:
identifying digital content items that have a lowest request rate from clients of the first base station and the second base station and deleting secondary copies of the identified lowest request rate digital content items.

14. The method of claim 11, further comprising:
identifying digital content items most likely to be requested by clients of the first base station in the future and storing local copies for each identified most likely to be requested digital content item.

15. A system for distributing digital content, comprising:
a first node providing a cell of a wireless communications cellular network for one or more clients communicatively connected to the first node, the first node comprising a first base station;
a second node communicatively connected to the first node and comprising a second base station; and
a plurality of third nodes forming a mesh network with the first node and the second node, whereby each of the plurality of third nodes is communicatively connected to the first node through the mesh network, and wherein at least one of the plurality of third nodes comprises a third base station;
wherein the second node comprises a second storage device and a second processor; and
wherein the first node comprises:
a local storage device;
a local processor;
a content requestor to receive, over the wireless communications cellular network and from a client of the one or more clients, a request for a remote copy of a digital content item from a remote computing device;
a content distributor to:
track a frequency with which the digital content item is requested;
in response to determining that the frequency satisfies a threshold for a predefined period of time, generate a request for the digital content item; and
store the digital content item in one of the first and second local storage devices; and
a content server of the first node or the second node to:
identify whether the local storage device has a local copy of the digital content item;
determine whether each of a plurality of secondary sources stores a secondary copy of the digital content item at at least one of the second base station or the first base station, the plurality of secondary sources comprising a mesh node of the wireless communications cellular network and a storage or processing device within a location of a client of the one or more clients;
identify a secondary source of the plurality of secondary sources other than the remote computing device that stores a secondary copy of the digital content item at at least one of the second base station or the first base station;
determine which of the first node, the remote computing device, or the second node is capable of delivering the digital content item to the client in a least amount of time by estimating times for delivering the digital content to the client from at least one of the first node, the remote computing device, or the second node; and
deliver, over the wireless communications cellular network, the digital content item to the client from the first node, the remote computing device, or the second node that requires the least amount of time to deliver to the client.

16. The system of claim 15, wherein the first node further comprises:
a local network component to deliver the local copy if the local copy is available on the local storage device.

17. The system of claim 15, wherein the first node further comprises:
a cache of a plurality of digital content items on the local storage device for the client of the first node.

18. The system of claim 15, wherein the content server is further configured to determine if the at least one of the plurality of third nodes has another copy of the digital content item, and wherein the first node further comprises:
a network cache to implement a cache of a plurality of remote digital content items stored on the plurality of third nodes in the mesh network.

19. The system of claim 15, wherein the first node further comprises:
a content distributor configured to receive and store at least one local copy of the digital content item in the local storage device, wherein the at least one local copy is pushed to the content distributor by an authorized remote computing device.

20. The system of claim 1, wherein the content distributor is located at the first base station or the second base station.

* * * * *